US008299971B2

(12) United States Patent
Talty et al.

(10) Patent No.: US 8,299,971 B2
(45) Date of Patent: Oct. 30, 2012

(54) CONTROL MODULE CHASSIS-INTEGRATED SLOT ANTENNA

(75) Inventors: Timothy J. Talty, Beverly Hills, MI (US); Rod Niner, Royal Oak, MI (US); Fred W. Huntzicker, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 287 days.

(21) Appl. No.: 12/727,298

(22) Filed: Mar. 19, 2010

(65) Prior Publication Data
US 2010/0245184 A1 Sep. 30, 2010

Related U.S. Application Data

(60) Provisional application No. 61/163,385, filed on Mar. 25, 2009.

(51) Int. Cl.
*H01Q 1/24* (2006.01)
*H01Q 13/10* (2006.01)

(52) U.S. Cl. ........................................ 343/702; 343/767

(58) Field of Classification Search .................. 343/702, 343/767
See application file for complete search history.

(56) References Cited

U.S. PATENT DOCUMENTS

| 4,123,756 A | | 10/1978 | Nagata et al. | |
|---|---|---|---|---|
| 5,642,120 A | * | 6/1997 | Fujisawa | 343/702 |
| 5,757,326 A | * | 5/1998 | Koyama et al. | 343/702 |
| 5,940,041 A | * | 8/1999 | Koyama et al. | 343/702 |
| 6,879,293 B2 | | 4/2005 | Sato | |
| 2005/0146475 A1 | * | 7/2005 | Bettner et al. | 343/767 |
| 2007/0194994 A1 | | 8/2007 | Waltho | |
| 2009/0153410 A1 | * | 6/2009 | Chiang et al. | 343/702 |

FOREIGN PATENT DOCUMENTS

| DE | 000T0010432 MA | 8/1956 |
|---|---|---|
| DE | 1802767 U | 12/1959 |
| DE | 3904676 A1 | 8/1990 |
| DE | 4000381 A1 | 7/1991 |
| DE | 19628125 A1 | 1/1998 |
| DE | 20080128 U1 | 5/2001 |
| DE | 202004017672 U1 | 3/2005 |
| EP | 0878040 B1 | 10/1999 |

(Continued)

OTHER PUBLICATIONS

IEEE Computer Society, Wireless Medium Access Control (MAC) and Physical Layer (PHY) Specifications for Wireless Personal Area Networks (WPANs), IEEE Standard for Information Technology—Telecommunications and Information Exchange between Systems—Local and Metropolitan Area Networks—Specific Requirements, Norm IEEE 802.15.1, Jun. 14, 2005, New York, NY.

(Continued)

*Primary Examiner* — Jacob Y Choi
*Assistant Examiner* — Hasan Islam

(57) ABSTRACT

A control module has a conductive metal chassis with a chassis body and a chassis lid. A non-conductive opening is formed within the chassis body and a tab extends from the chassis lid engaging edges of the non-conductive opening to create a rectangularly-shaped non-conductive aperture with a longitudinal axis having a predetermined length for forming a slot antenna structure. The predetermined length is designed to communicate with a specific communications frequency. The slot antenna structure is signally interconnected to a transceiver housed within the chassis.

20 Claims, 3 Drawing Sheets

FOREIGN PATENT DOCUMENTS

WO   2007008235 A1   1/2007
WO   2007136321 A1   11/2007

OTHER PUBLICATIONS

IEEE Computer Society, Wireless LAN Medium Access Control (MAC) and Physical Layer (PHY) Specifications, IEEE Standard for Information Technology—Telecommunications and Information Exchange between Systems—Local and Metropolitan Area Networks—Specific Requirements, Norm IEE80211, Jun. 14, 2005, New York, NY.

Freescale Semiconductor, Compact Integrated Antennas, Designs and Applications for the MC1319x, MC1320x, and MC1321x, AN2731, Rev. 1.3, Jul. 2006.

* cited by examiner

CONTROL MODULE CHASSIS-INTEGRATED SLOT ANTENNA

CROSS REFERENCE TO RELATED APPLICATIONS

This application claims the benefit of U.S. Provisional Application No. 60/163,385, filed on Mar. 25, 2009, which is incorporated herein by reference.

TECHNICAL FIELD

This disclosure is related to short-range wireless communications within vehicles.

BACKGROUND

The statements in this section merely provide background information related to the present disclosure and may not constitute prior art.

Control modules on-board a land vehicle can control vehicle operation, including, e.g., engine, transmission, power management, chassis, braking, steering, and other systems. Furthermore there can be a plurality of information and entertainment (infotainment) services available, including, e.g., AM/FM radio, portable music players, cellular phones, GPS navigation, satellite radio, remote keyless entry, and remote vehicle starting. Control modules are preferably spatially located near the functional area they control to minimize length of wiring harnesses to sensing devices and actuators. Thus, an engine control module is preferably placed in or near an engine compartment and infotainment modules are placed in a passenger compartment. However, vehicle space utilization is becoming more problematic as features are added to an already limited packaging environment. Wire harness routing and availability also may limit the positioning of control modules into certain locations of the vehicle that may otherwise be acceptable.

A control module may need to communicate with one or more of the other control modules in a vehicle. Known communication methods include a wired local area network that has a shared communications bus. Wireless communication is also possible. In addition, portable wireless devices and other applications can be interfaced with an on-vehicle control module and the vehicle's user interface devices. For example, cellular phones equipped with a wireless communications system can utilize the vehicle speakers and a microphone to enable hands-free calling. A portable music player device can use an embedded audio/visual system to play back music and other audio and/or video files.

Wireless communications protocols for communicating between control module devices include IEEE 802.15.1 and IEEE 802.11 wireless protocols. The IEEE 802.15.1 wireless communications protocol uses a secure, unlicensed ISM 2.4 GHz short-range radio frequency bandwidth. Use of the IEEE 802.15.1 wireless communications protocol facilitates short range (1 to 10 m), low power wireless communications using a low-cost transceiver. The IEEE 802.11 wireless communications protocol also uses a secure, unlicensed ISM 2.4 GHz radio frequency bandwidth with a longer range (32 to 95 m) and increased power consumption.

Wireless communications require the use of an antenna connected to a transceiver device. Thus, each control module using wireless communications requires an antenna connected to a local transceiver device. Antenna design is critical to achieve effective range and signal throughput. Antenna design criteria include antenna shape, size, and length that are tuned to a communications wavelength and to the effects of the neighboring environment including metallic and dielectric materials including ground planes. Antenna performance and operating characteristics include gain, radiation pattern, polarization, radiation resistance and input impedance.

One method to design an antenna is to create an electrical resonate structure. When electrically excited at the resonant frequency, the resonate structure 'leaks' energy that radiates away from the structure. For example, a half-wave length resonate structure is created with an antenna length that is approximately a half-wavelength, which is half the wavelength of the intended radio frequency (RF) field.

Different antenna structures have been proposed for on-board short range wireless communications, including external antennas and antennas formed by depositing conductive films, strips, dielectric materials or wires on printed circuit boards. In order to make an antenna fit into allowable packaging space, one or more of the antenna performance characteristics may be impaired.

SUMMARY

A control module has a conductive metal chassis with a chassis body and a chassis lid. A non-conductive opening is formed within the chassis body and a tab extends from the chassis lid engaging edges of the non-conductive opening to create a rectangularly-shaped non-conductive aperture with a longitudinal axis having a predetermined length for forming a slot antenna structure. The predetermined length is designed to communicate with a specific communications frequency. The slot antenna structure is signally interconnected to a transceiver housed within the chassis.

BRIEF DESCRIPTION OF THE DRAWINGS

One or more embodiments will now be described, by way of example, with reference to the accompanying drawings, in which.

DETAILED DESCRIPTION

Figure 1:
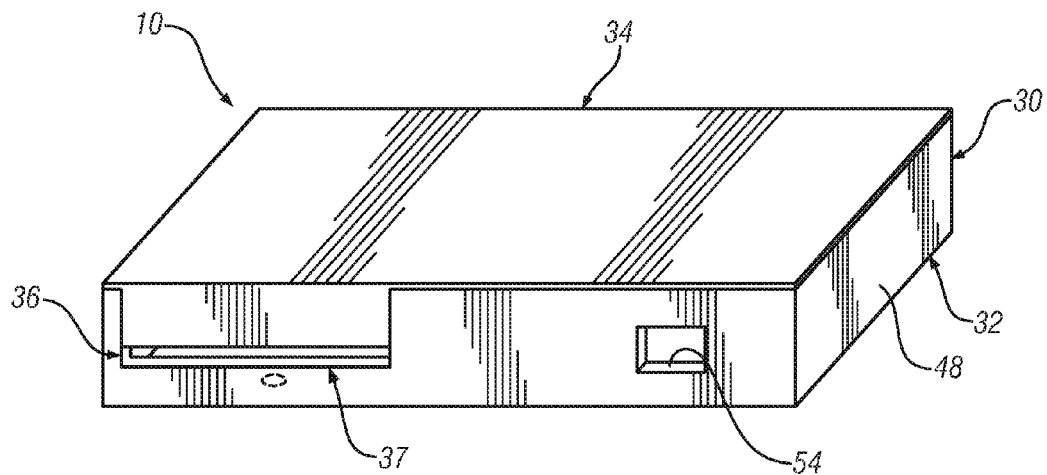
FIG. 1 is an isometric view of a control module and antenna structure in accordance with the present disclosure.

Referring now to the drawings, wherein the showings are for the purpose of illustrating certain exemplary embodiments only and not for the purpose of limiting the same, FIG. 1 schematically illustrates a control module 10 and an antenna structure in accordance with the present disclosure. A plurality of control modules 10 is located in various spaces within a vehicle which may include a trunk area, a passenger compartment, and an engine compartment. Preferably each of the control modules 10 communicates with one or more of the other control modules 10. Communication messages may include, by way of example, audio or visual information, control signals, sensor signals, diagnostics signals, and confirmatory signals. A control module 10 may also include a portable remote device, e.g., a cellular phone or a music playing device with wireless capability, which is also operative to communicate with the on-vehicle control modules 10.

The control module 10 includes a chassis 30 that provides housing for at least one printed circuit board 52 therein. The chassis 30 includes a chassis body 32 and a chassis lid 34. A slot antenna 36 is formed by creating an aperture 37 between the two metallic structures, i.e., an aperture 37 is created between the chassis body 32 and the chassis lid 34 when assembled. Alternatively, the slot antenna 36 can be formed in the chassis 30 by creating an aperture 37 in one of the chassis body 32 and the chassis lid 34, for example by machining, stamping, casting, etc. A slot antenna includes a substantially regularly shaped (e.g. rectangular) aperture having a length along an elongated major axis (longitudinal axis) of and a substantially shorter height along an orthogonal minor axis.

The chassis body 32 preferably has one or more pass-through voids 54 therein to accommodate access points such as an electronic power connection for powering at least one printed circuit board 52 or additional connectors as necessary, e.g., vehicle wiring, RCA, HDMI, and optical connectors.

Figure 2:
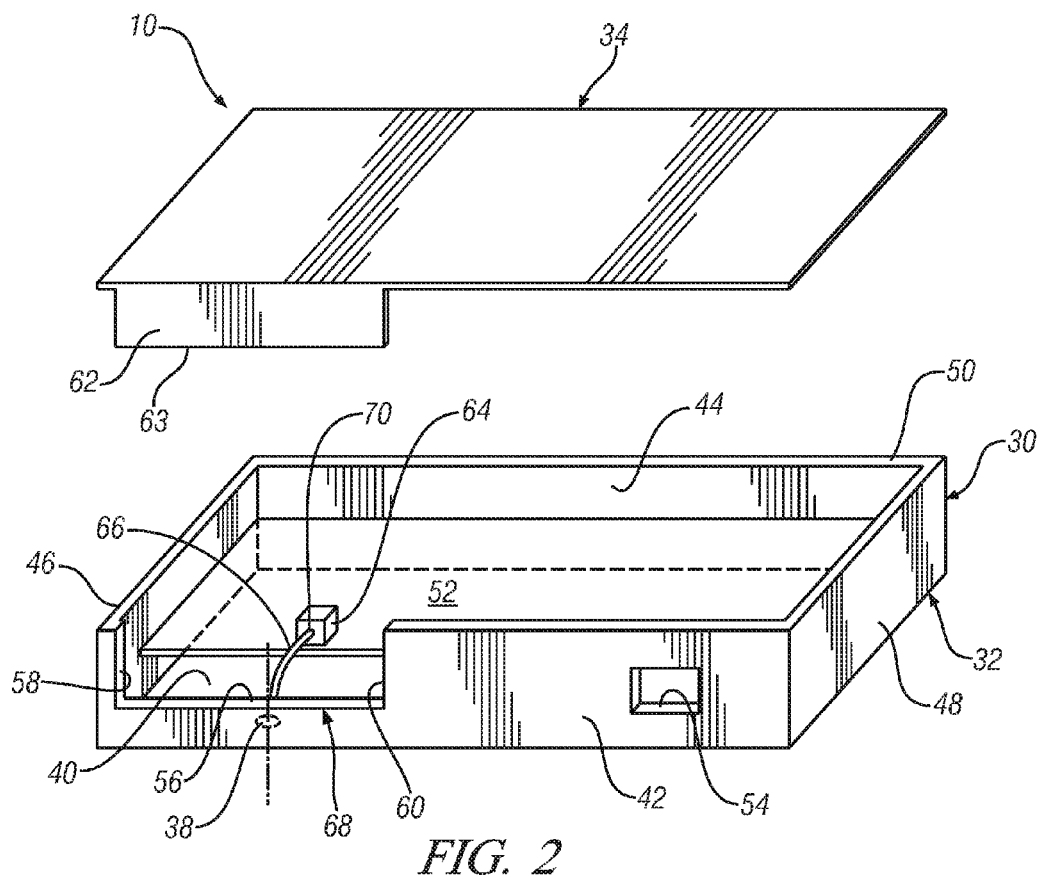
FIG. 2 is an isometric exploded view of a control module and antenna structure with a remote transceiver in accordance with the present disclosure.

In the embodiment illustrated in FIGS. 1 and 2, the slot antenna 36 is formed by creating an aperture 37 between the chassis body 32 and lid 34. The chassis body 32 and chassis lid 34 are formed from electro-magnetically conductive metal, e.g., mild steel. The slot antenna 36 is a non-conductive aperture 37 in the conductive metal of the chassis body 32 and lid 34, and is preferably approximately half of the desired communication frequency wavelength along its longitudinal axis. Thus, when the control module 10 communicates using an ISM 2.4 GHz short-range radio frequency bandwidth with a wavelength of 12.5 cm and a resulting half-wavelength of about 6.25 cm, the preferred length along the longitudinal axis is about 6.25 cm, and is tuned for the specific communication frequency. In practice, it has been found that lesser slot antenna 36 lengths result in better energy coupling performance due to the environmental effects of the dielectric and/or metallic objects in the neighboring vicinity of the slot antenna 36. The half-wavelength slot antenna 36 provides near omni-directional signal coverage about the slot antenna 36 that is perpendicular to the longitudinal axis of the slot antenna 36 and is described in further detail below.

Although a half wavelength slot antenna 36 has been described in detail, other antenna lengths, e.g., a full wavelength, three-quarter wavelength, or quarter wavelength, are also within the scope of this disclosure and have a direct mathematical relationship to the wavelength desired. Using the above example of the ISM 2.4 GHz short-range radio frequency, this would result in a full wavelength slot antenna 36 of approximately 12.5 cm in length, a three-quarter wavelength slot antenna 36 approximately 9.375 cm in length, and a quarter wavelength slot antenna 36 of approximately 3.125 cm in length.

FIG. 2 schematically shows the chassis 30 with the chassis lid 34 disassembled from the chassis body 32. The chassis body 32 has a generally planar, rectangular bottom 40 with a plurality of upwardly extending sides, including a back 42, a front 44, and opposing sides 46, 48, forming a generally planar top edge 50. The chassis body 32 therefore forms a three-dimensional metal box configured to accommodate one or more electronic circuit boards 52. The chassis body 32 preferably has one or more pass-through voids 54 therein to accommodate access points, such as an electronic power connection or other connectors as necessary. The chassis body 32 includes a rectangularly-shaped opening 68 defined by two side edges 58, 60 which extend from the planar top edge 50 to a bottom edge 56 in one side, e.g., the back side 42. In the preferred embodiment, the length of the bottom edge 56 is the length of the longitudinal axis of the slot antenna and therefore the length of the desired communication frequency half-wavelength, i.e., about 6.25 cm for an ISM 2.4 GHz short-range radio frequency bandwidth.

A feed point 38 is located on the chassis body 32 preferably at a centerline of and adjacent to the bottom edge 56. The feed point 38 is interconnected to a transceiver 64 by an interconnect device 66. Altering the location of the feed point 38 from the centerline adjusts the input impedance for the slot antenna 36, i.e., impedance will be greater at the center line of the bottom edge 56 and reduced as the feed point 38 approaches either side edge 58, 60. The interconnect device 66 is routed to the transceiver 64 located on the printed circuit board 52 contained within the chassis 30. The slot antenna 36 is therefore signally connected to the transceiver 64 which is further signally connected to the printed circuit board 52 of the control module 10.

The chassis lid 34 is preferably a rectangularly-shaped conductive metal piece configured to engage the top edge 50 of the chassis body 32. The chassis lid 34 further includes tab 62 with an edge portion 63 that projects into the rectangularly-shaped opening 68 of the chassis body 32 when the chassis lid 34 is assembled onto the chassis body 32. When the tab 62 is assembled into the rectangularly-shaped opening 68, the tab 62 extends from one side edge 58 to the other side edge 60 and creates the aperture 37 defining the slot antenna 36 between the edge portion 63 and the bottom edge 56. The slot antenna 36 is therefore formed by the remaining space defined by the assembly of the tab 62 into the rectangularly-shaped opening 68 of the chassis body 32 and has its longitudinal axis generally parallel with the chassis bottom 40. Therefore, the slot antenna 36 is bound by the bottom edge 56, the edge portion 63, and the exposed portion of the side walls 58, 60. The height of the slot antenna 36 is equal to that of the exposed side walls 58, 60 and is substantially less than the length of the bottom edge 56. The slot antenna 36 can be filled with a non-conductive substance, e.g., epoxy, to form an environmental seal between the exterior and interior of the control module 10.

Figure 3:
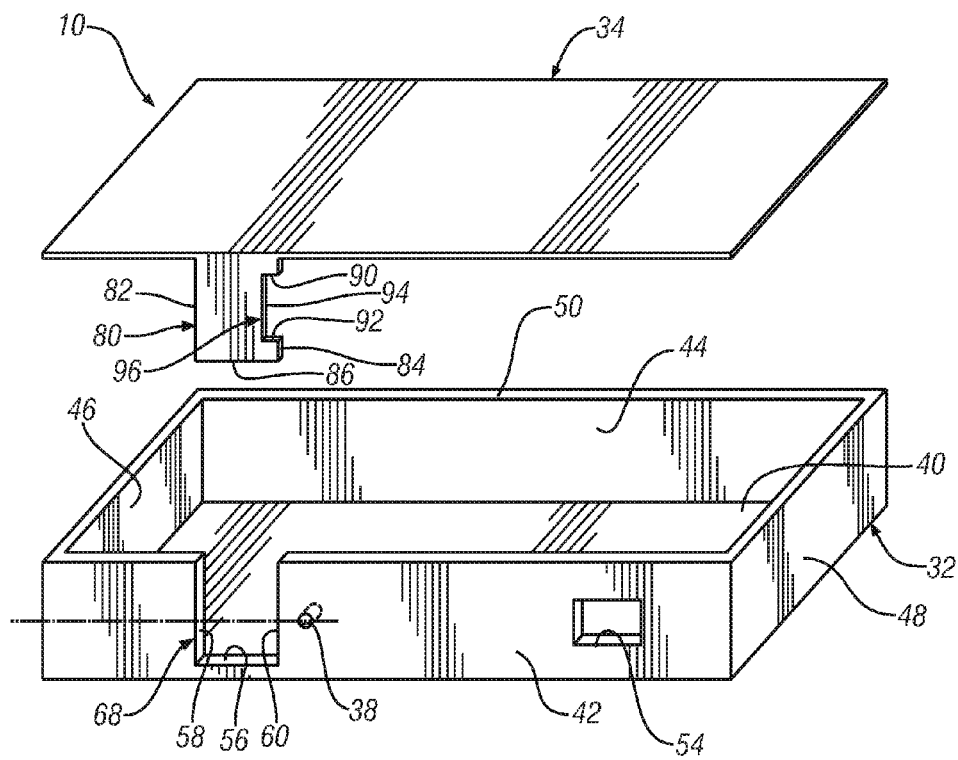
FIG. 3 is one embodiment wherein a slot antenna is placed in a orthogonal orientation thereby creating additional and differing antenna properties in accordance with the present disclosure.

FIG. 3 shows an alternative embodiment wherein a slot antenna is placed in an orthogonal orientation (relative to the chassis bottom and the longitudinal axis of the slot antenna of FIGS. 1 and 2) and thereby creating additional and differing antenna properties. For example, an orthogonally oriented slot antenna provides near omni-directional signal coverage about the slot antenna that is perpendicular to the longitudinal axis of the slot antenna. The orthogonal slot antenna is constructed similarly to that of the already described slot antenna in that the chassis body and lid cooperatively form the slot antenna. That is, a chassis body 32 is similar in construction as above with a bottom 40, plurality of sides 42, 44, 46, 48 forming a generally planar top edge 50 and at least one side having at least one pass-through void 54. The chassis body 32 includes a rectangularly-shaped opening 68 defined by two side edges 58, 60 extending from the planar top edge 50 to a bottom edge 56 in one side, e.g., the back side 42. In this embodiment, the length of the side edges 58, 60 is at least the desired communication frequency half-wavelength, i.e., about 6.25 cm for an ISM 2.4 GHz radio frequency bandwidth, or the frequency quarter-wavelength, i.e., about 3.125 cm for an ISM 2.4 GHz radio frequency bandwidth, as tuned for a specific application. The feed point 38 is located adjacent the edge 58, 60 that will be used as an antenna wall, e.g., edge 60 as depicted, at approximately the centerline of the slot antenna and may be adjusted for input impedance as above.

The chassis lid 34 is similar to that as described above shaped to engage the top edge 50 of the chassis body 32 and including a tab 80. The tab 80 projects into the rectangularly-shaped opening 68 of the chassis body 32 when the chassis lid 34 is assembled onto the chassis body 32. The tab 80 has a first side 82, a second side 84, and a bottom edge 86. Each edge 82, 84, 86 of tab 80 mates to a corresponding edge of the rectangularly-shaped opening 68 of the chassis body 32 when the chassis lid 34 is assembled onto the chassis body 32. The side edge 84 further includes a rectangularly-shaped slot 96 defined by upper and lower boundaries 90, 92 extending inwardly from edge 84 and an inner boundary 94. The length of the inner boundary 94 is the desired communications frequency quarter-wavelength or half-wavelength, as designed for a particular application. The slot antenna is therefore an aperture defined by side edge 60 and boundaries 90, 92, and 94 and has its longitudinal axis generally orthogonal to the chassis bottom 40. It will be apparent to one of ordinary skill in the art that the slot antenna could be on either wall 58 or 60. It should also be apparent that the side edge 84 of tab 80 may have lower boundary 92 removed and replaced with the bottom edge 56 of the rectangularly shaped opening 68 in the chassis body 32. Alternatively, tab 80 may include only sides 82, 84 and bottom edge 86 with distance between bottom edge 86 and the bottom edge 56 defining the half frequency wavelength, i.e., the slot antenna may be formed by edges 58, 60 and bottom edges 56, 86 with the frequency half wavelength equal to the remaining exposed edges 58 and 60.

Although two exemplary orientations have been discussed in detail, the disclosure is not so limited. As will be apparent to one of ordinary skill in the art, the orientation of the slot antenna may be place on an angle in relation to the chassis bottom 40, e.g., the longitudinal axis of the slot antenna can be oriented at a 15 degree, 30 degree, 45 degree, 60 degree, 75 degree, or another angle at which facilitates robust communication.

In one embodiment the tab 62 shape can be adjusted to match another desired operating frequency without the need to adjust the shape of the rectangularly-shaped opening 68 in the chassis body 32, hence enabling reuse of the chassis body 32 for other frequencies without requiring any mechanical changes to the chassis body 32.

In one embodiment, the slot antenna is electromagnetically coupled to a coupling mechanism 70 of transceiver 64 located on a printed circuit board 52 contained within the chassis 30. In such embodiments, the coupling mechanism is located on the printed circuit board 52 and can include one of an electronic trace, a resonate structure, and dielectric material. For maximum power transfer, the electric and magnetic fields of the coupling mechanism are aligned with a longitudinal axis of the slot antenna.

In one embodiment, an electrical feed structure 66 having electrically conductive wires, e.g., twin lead, ladder line, and coaxial cables can be interconnected between the feed point 38 and the transceiver 64. In such embodiments, a connection is made adjacent the rectangularly-shaped void 68 in the chassis 30 that forms the slot antenna.

In one embodiment, multiple slot antennas may be implemented on a single control module 10. The additional slot antennas can include redundant frequency range antennas, e.g., multiple antennas operating at ISM 2.4 GHz or other suitable radio frequencies, to aid in maintaining robust communications in one frequency range. The additional slot antennas can also include slot antennas of multiple frequency ranges, e.g., ISM 2.4 GHz or 5.8 GHz, to facilitate communication with multiple control modules 10 or a single control module 10 over multiple frequency ranges. The additional slot antennas may be positioned in different orientations, e.g., parallel or orthogonal, different locations, e.g., one located on the back 42 and one located on the side 46, or a combination of the two, e.g., a parallel oriented slot antenna on the back 42 and orthogonally oriented slot antenna on the side 46 as may be required by packaging or to promote robust communication between control modules 10. Additionally, when multiple slot antennas are utilized, each slot antenna will have a feed point 38. Each feed point 38 may be used to communicate with a single or multiple transceiver 64 on a single or multiple printed circuit boards 52. For example, a single transceiver 64 may be used to communicate with an orthogonal slot antenna on the back 42 and a parallel slot antenna on the side 46 or the same slot antennas may feed multiple transceivers on a single or separate printed circuit boards 52.

Figure 4:
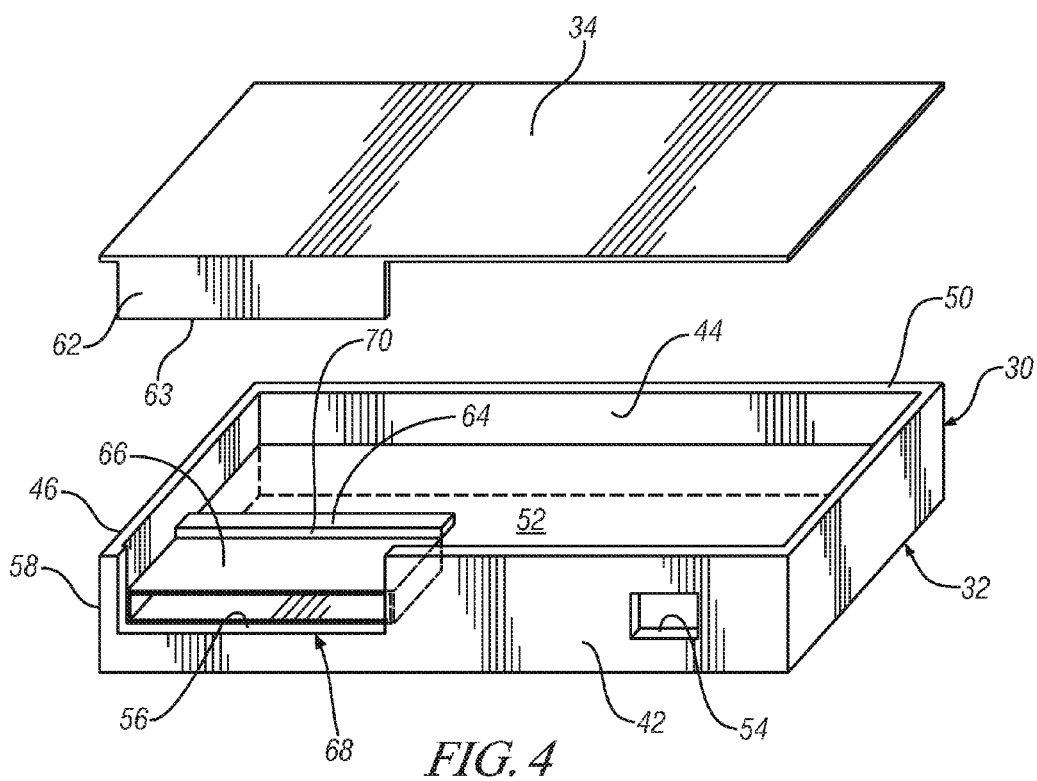
FIG. 4 is one embodiment wherein an interconnect device may be a waveguide to signally interconnect a feed point to a transceiver in accordance with the present disclosure.

FIG. 4 shows an alternative embodiment wherein the interconnect device 66 may be a waveguide to signally interconnect the feed point 38 to the transceiver 64. The waveguide interconnect device 66 can be a hollow metallic waveguide that includes a rectangular hollow tubular section. The hollow metallic waveguide has the hollow section aligned with the slot antenna and directed to the transceiver 64 located on the printed circuit board 52. Additionally a dielectric waveguide, e.g., microstrip, or stripline, may be used for the interconnect device 66. The dielectric waveguide includes a conductive strip either embedded within or on top of a dielectric layer which is placed on top of a wider ground plane. The dielectric waveguide is signally connected between the slot antenna and the transceiver 64 located on the printed circuit board 52.

Figure 5:
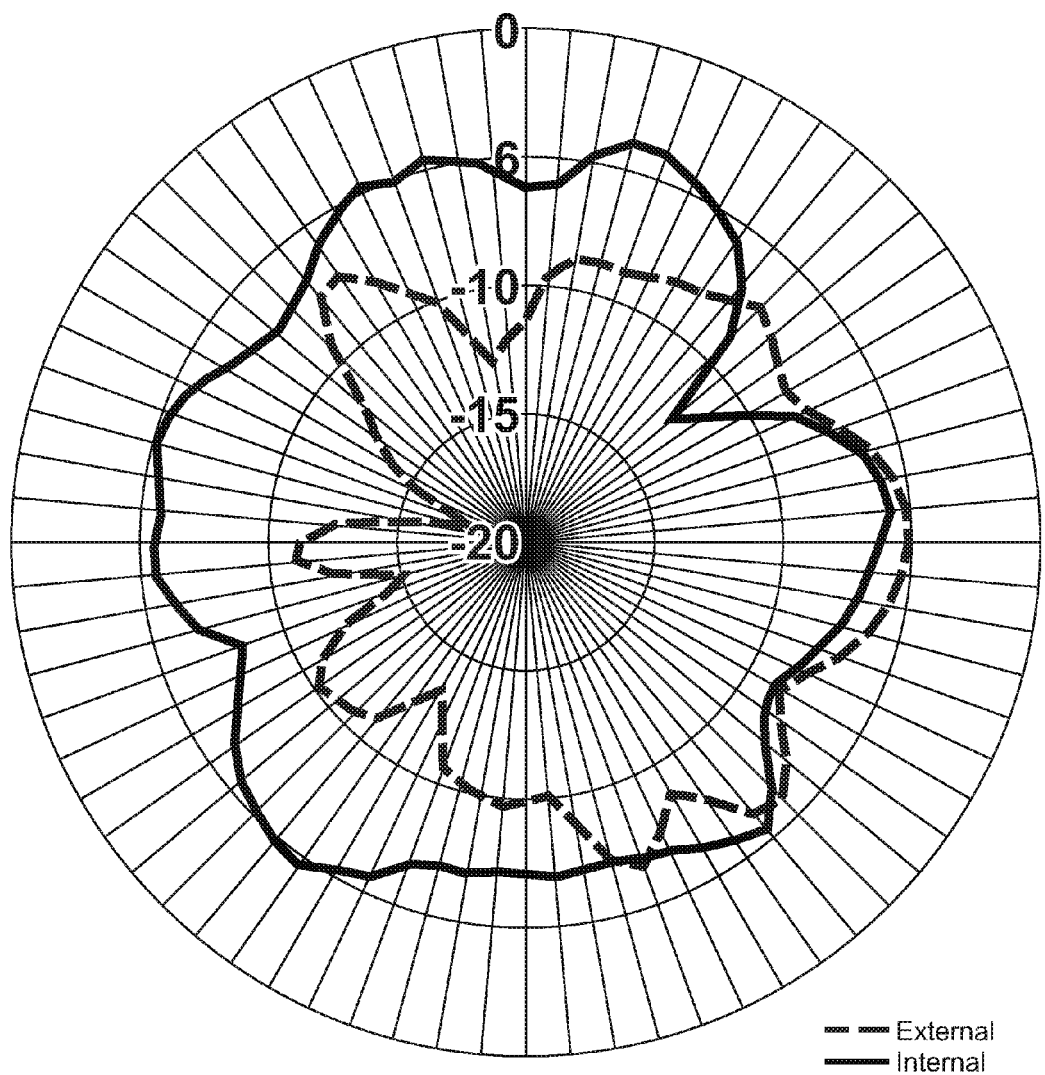
FIG. 5 is a graphical representation of an antenna radiation pattern and signal gain (loss) for an exemplary chassis slot antenna in accordance with the present disclosure.

FIG. 5 shows a graphical representation of an antenna radiation pattern and signal gain (loss) for an exemplary chassis slot antenna that was constructed in accordance with the preferred embodiment of the concepts described herein. The half-wavelength slot antenna provides substantially omni-directional signal coverage about the slot antenna that is perpendicular to the longitudinal axis of the slot antenna. For comparison, a radiation pattern and signal gain (loss) for an externally mounted antenna is compared therewith. The antenna radiation pattern for the chassis slot antenna indicates less signal loss and improved signal directivity as compared to the radiation pattern and signal gain (loss) for a conventional externally mounted antenna. Thus the slot antenna formed by the chassis 30 is robust to variations in orientation, permitting flexibility in control module packaging within a vehicle 10. However, since the radiation pattern is known, an additional transceiver 64 can be placed within the vehicle, or the antenna can be oriented within the chassis 30, to permit radiation patterns of both antennae to approximate the location of each transceiver 64.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:
1. A control module, comprising:
a conductive metal chassis including
a chassis body comprising a chassis bottom with a plurality of upwardly extending sides forming a planar top edge, and a chassis lid configured to engage the top edge of the chassis body;

at least one electronic circuit board accommodated within the chassis body;

a non-conductive opening defined by two side edges which extend from the planar top edge of the chassis body to a bottom edge in one of the upwardly extending sides of the chassis body;

a tab extending from the chassis lid engaging the two edges of the non-conductive opening and projecting into the non-conductive opening when the chassis lid is assembled onto the chassis body for creating a rectangularly-shaped non-conductive aperture with a longitudinal axis having a predetermined length for forming a slot antenna structure, said predetermined length being a length designed to communicate with a specific communications frequency; and the slot antenna structure signally interconnected to a transceiver housed within the chassis.

2. The control module of claim 1, wherein the longitudinal axis of the aperture is horizontally oriented relative to the chassis bottom of the chassis body.

3. The control module of claim 1, wherein the longitudinal axis of the aperture is orthogonally oriented relative to the chassis bottom of the chassis body.

4. The control module of claim 1, wherein modifying the predetermined length of the longitudinal axis establishes the operating frequency of the slot antenna structure.

5. The control module of claim 1, wherein the predetermined length of the longitudinal axis is equal to a half-wavelength of the operating frequency.

6. The control module of claim 1, wherein the predetermined length of the longitudinal axis is equal to a quarter-wavelength of the operating frequency.

7. The control module of claim 1, wherein the aperture is filled with a non-conductive substance to form an environmental seal.

8. The control module of claim 1, wherein the longitudinal axis is oriented to provide perpendicular omni-directional signal coverage to approximate the location of another transceiver remote from the control module.

9. The control module of claim 1, wherein the aperture signally interconnected to the transceiver includes a feed point adjacent to the aperture.

10. The control module of claim 9, wherein the aperture includes a tunable impedance, the impedance being tunable by adjustment of the feed point distance from a centerline of the longitudinal axis of the slot antenna structure.

11. The control module of claim 1, wherein the slot antenna structure is interconnected to the transceiver by an interconnect device.

12. The control module of claim 11, wherein the interconnect device comprises an electrical feed structure.

13. The control module of claim 11, wherein the interconnect device comprises an electromagnetic coupling to a coupling mechanism.

14. The control module of claim 13, wherein electric and magnetic fields of the electromagnetic coupling are aligned with the longitudinal axis of the aperture.

15. The control module of claim 11, wherein the interconnect device comprises a waveguide.

16. A control module, comprising:
a conductive metal chassis comprising
a chassis body including a chassis bottom with a plurality of upwardly extending sides forming a planar top edge, and
a chassis lid configured to engage the top edge of the chassis body;
a non-conductive opening defined by two side edges which extend from the planar top edge of the chassis body to a bottom edge in one of the upwardly extending sides of the chassis body;
a tab extending from the chassis lid engaging the two edges of the non-conductive opening and projecting into the non-conductive opening when the chassis lid is assembled onto the chassis body for creating a rectangularly-shaped non-conductive aperture with a longitudinal axis having a predetermined length for forming a slot antenna structure, said predetermined length being a length designed to communicate with a specific communication frequency; and
the aperture signally connected to a transceiver housed within the control module.

17. The control module of claim 16, wherein the longitudinal axis predefined length is capable of communication with wireless communication protocol IEEE 802.15.1.

18. The control module of claim 16, wherein the longitudinal axis predefined length is capable of communication with wireless communication protocol IEEE 802.11.

19. A control module, comprising:
a chassis body fabricated from conductive metal and including a non-conductive opening comprising a bottom edge portion and adjacent upwardly extending side-edge portions forming a planar top edge;
a chassis lid configured to engage the top edge of the chassis body and fabricated from conductive metal including a tab having an edge portion, the tab projecting into the non-conductive opening of the chassis body such that the edge portion is adjacent to the bottom edge portion of the chassis body when the chassis lid is assembled on the chassis body;
at least one electronic circuit board accommodated within the chassis body;
an aperture formed from the bottom edge portion of the chassis body, the adjacent side-edge portions, and the edge portion of the tab, the aperture having a longitudinal axis of a predetermined length, the predetermined length corresponding to an operating frequency for a wireless communications protocol associated with a short-range radio frequency bandwidth;
the aperture being filled with a non-conductive material; and
the aperture signally interconnected to a transceiver.

20. The module of claim 19, wherein the control module is wirelessly communicative with a second control module.

* * * * *